United States Patent [19]

Herh et al.

[11] Patent Number: 5,268,928
[45] Date of Patent: Dec. 7, 1993

[54] DATA MODEN WITH REMOTE FIRMWARE UPDATE

[75] Inventors: Ting Herh; Lungshan She, both of Milpitas, Calif.; Adolfo J. Hidalgo, Plantation, Fla.

[73] Assignee: Racal-Datacom, Inc., Sunrise, Fla.

[21] Appl. No.: 776,969

[22] Filed: Oct. 15, 1991

[51] Int. Cl.⁵ .................... H04L 5/16; H04B 1/38
[52] U.S. Cl. ........................................ 375/8; 379/39
[58] Field of Search .............. 375/8, 9, 7; 379/93; 364/134, 136, 13

[56] References Cited

U.S. PATENT DOCUMENTS

| | | | |
|---|---|---|---|
| 3,842,405 | 10/1974 | Key et al. ............... | 375/8 |
| 4,841,561 | 6/1989 | Hill ........................ | 375/8 X |
| 4,918,623 | 4/1990 | Lockitt et al. .......... | 364/514 |
| 4,956,852 | 9/1990 | Hodge .................... | 375/8 |
| 5,070,500 | 12/1991 | Horinouchi et al. ..... | 375/8 X |
| 5,131,025 | 7/1992 | Hamasaki ............... | 375/8 X |

OTHER PUBLICATIONS

*Communications Week*, "Modem Moves", by Judith Levine, dated Jun. 3, 1991.

Primary Examiner—Curtis Kuntz
Assistant Examiner—Bryan E. Webster
Attorney, Agent, or Firm—Jerry A. Miller; William A. Newton

[57] ABSTRACT

A data modem is provided with a boot ROM having a set of instructions for a programmable processor to perform its basic functions within the modem. Enhancements and firmware updates are downloaded over a telephone line through the modem's inherent communications abilities and stored in a battery backed RAM. This permits firmware updates and enhancements to be implemented remotely without need for replacement of ROM or opening of the modem housing.

5 Claims, 2 Drawing Sheets

DATA MODEN WITH REMOTE FIRMWARE UPDATE

BACKGROUND

1. Field of the Invention

This invention relates generally to the field of data communications. More particularly, this invention relates to an improved data modem having the capability of receiving firmware updates which alter the operation of the modem itself from a remote location.

2. Background of the Invention

Data modems have become increasingly more complex devices over the last several years. Such devices now frequently incorporate internal diagnostics, error correction, compression, remote network management functions and other advanced features. These features are most frequently implemented using a programmed computer internal to the modem. A good example of such a feature is data compression. As time goes on, better and better data compression algorithms are developed which permit higher effective throughput over conventional telephone lines.

In order to take advantage of advances in this technology, the user typically has to either purchase a new modem or have the hardware of his modem upgraded. The latter, normally requires that a program ROM (Read Only Memory) be replaced with an updated ROM by a service technician. This is obviously inconvenient and possibly expensive in a large network.

It is known to utilize modems to communicate, for example, software upgrades and patches for software used on computers such as personal computers. The use of a modem to download code which used internally to the modem to define or alter the function of the modem is heretofore unknown.

The present invention simplifies the process of upgrading the modem's firmware by providing a mechanism to use the modem's inherent communications capabilities to transfer upgraded firmware.

SUMMARY OF THE INVENTION

It is an object of the present invention to provide an improve data modem.

It is a feature that the present invention to provide the capability of upgrading a modem's firmware remotely without disassembly of the modem.

It is an advantage that the present invention permits firmware upgrades to be implemented faster and with less labor than required to manually replace the modem's ROM.

These and other objects, advantages and features of the invention will become apparent to those skilled in the art upon consideration of the following description of the invention.

In one embodiment of the present invention a data modem for transmitting and receiving data over a telephone line, includes a programmable processor for performing a modem function under control of a stored program. A boot memory stores a first set of instructions for use by the processor, the first set of instructions being adequate to permit the modem to transmit and receive data over a telephone line. The modem receives a second set of instructions over the telephone line from a remote location. An alterable memory stores the second set of instructions for use by the processor. The second set of instructions substitutes for at least a portion of the first set of instructions so that information received by the modem over the telephone lines is used to alter the manner in which the modem communicates over the telephone lines.

In another aspect, a data modem for transmitting and receiving data over a telephone line includes a programmable processor for performing a modem function under control of a stored program. A boot memory stores a first set of instructions for use by the processor, the first set of instructions being adequate to permit the modem to transmit and receive data over a telephone line as a CCITT V.32 compliant modem. The modem receives a second set of instructions over the telephone line from a remote location. The processor verifies that the second set of instructions are originating from an authorized source. An alterable memory stores the second set of instructions for use by the processor, the second set of instructions substituting for at least a portion of the first set of instructions. A write control prevents corruption of the second set of instructions. A battery backup coupled to the alterable memory maintains the information within the alterable memory when power is removed from the modem.

A method according to the invention for updating firmware in a data modem, includes the steps of: booting up the modem's internal processor from a ROM, the ROM having adequate information stored therein to permit the modem to perform at least basic modem communications functions; inspecting a download flag to determine whether or not the firmware is to be updated; if the firmware is not to be updated, entering a mode of normal modem operation; if the firmware is to be updated, placing the data modem in autoanswer mode; receiving a call from a source modem; receiving a set of updated firmware instructions from the source modem; storing the set of updated firmware instructions in an alterable memory; performing an error check on the updated firmware instructions stored in the alterable memory; if the error check indicates that the instructions are valid, resetting the download flag; and booting the modem's internal processor.

A data modem is provided with a boot ROM having a set of instructions for a programmable processor to perform its basic functions within the modem. Enhancements and firmware updates are downloaded over a telephone line through the modem's inherent communications abilities and stored in a battery backed RAM. This permits firmware updates and enhancements to be implemented remotely without need for replacement of ROM or opening of the modem housing.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
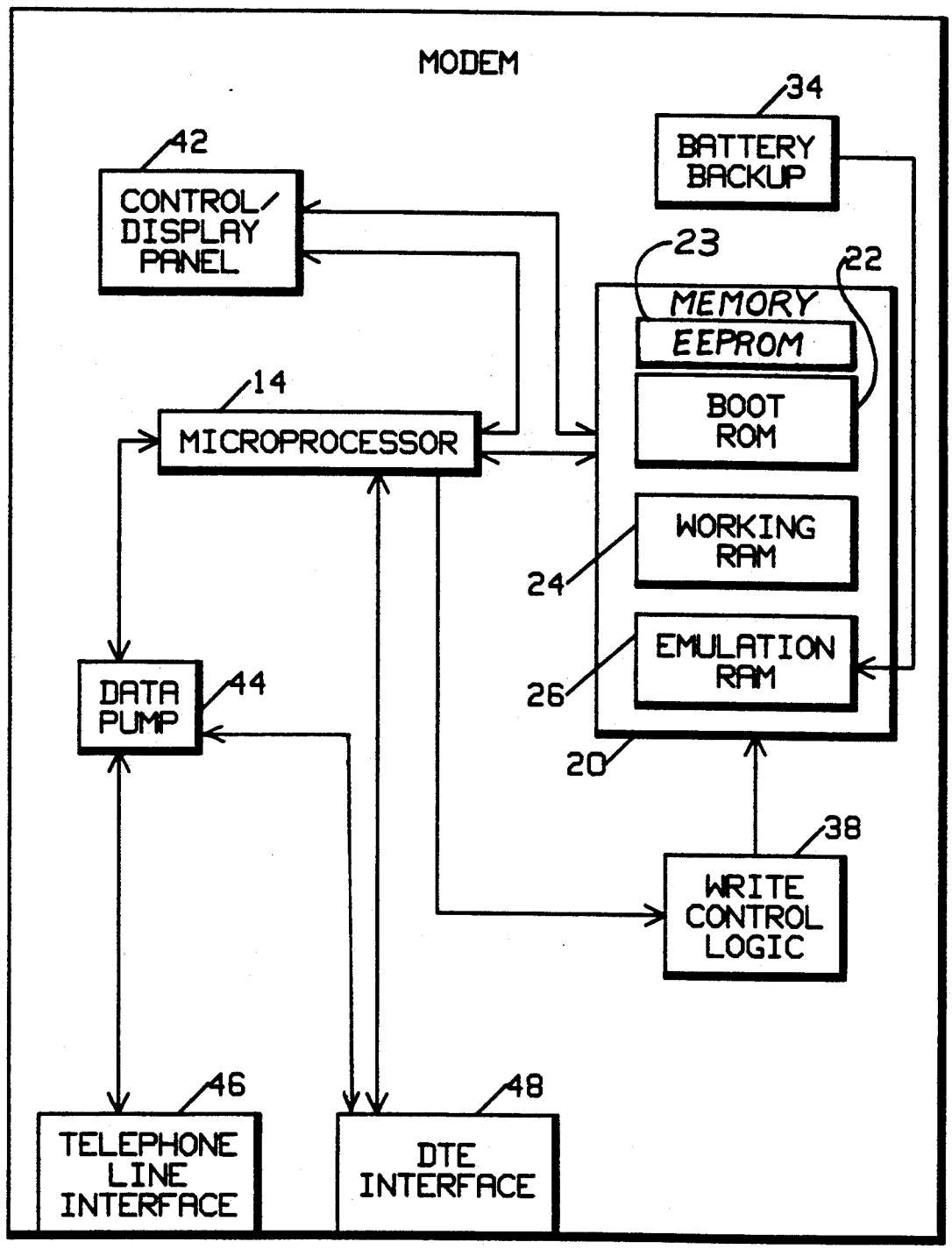
FIG. 1 is a block diagram of a modem according to the present invention.

Turning now to FIG. 1, a block diagram of a modem 10 according to the present invention is shown. The details of much of the conventional modem hardware are omitted for clarity of the present invention. Most modern modems such as 10 include a microprocessor 14 which may be used for any number of functions within the modem. For example, the microprocessor 14 may perform digital filtering and signal processing, encoding, decoding, slicing, scrambling, error checking, error correction, data formatting, etc. Microprocessor 14 may also be used to oversee and control the operation of various hardware such as the modem chip sets which are currently popular for implementation of standard modem operations.

In many modems, there may be multiple microprocessors handling various aspects of the modem operation. For example, one microprocessor may be used exclusively for signal processing, while another can oversee and control operation of the modem along with implementation of data compression. Many such configurations are possible, the details of which are not important to the fundamental invention. For purposes of this description, microprocessor 14 is intended to represent one or many such microprocessors.

Microprocessor 14 is coupled to memory 20 which is made up of ROM 22, working RAM (Random Access Memory) 24, and what will be referred to as emulation RAM 26. Emulation RAM is preferably backed up by a battery backup circuit 34 so that when the modem is disconnected from power due to power failure, storage or moving, its content is not lost. Battery backup circuitry such as 34 preferably includes a lithium battery interfaced in a known manner to the emulation RAM 26.

As will become clear later, the ability to write information to emulation RAM 26 is controlled by the microprocessor 14 via write control logic 38 which controls the write lines of the emulation RAM 26. The modem is operated via a control/display panel 42 which displays, prompts, menus, messages, etc. on a display and has switches required to respond to such prompts, menus, messages, etc. in a conventional manner.

The modem 10 includes a data pump 44 which is conventionally connected to a telephone line via a telephone line interface 46 and to a DTE (Data Terminal Equipment) interface 48 for connection to a DTE such as a computer terminal.

The modem 10 includes a set of instructions stored in Boot ROM 22 which are sufficient to Boot up the microprocessor 14 and implement basic modem functions. In the preferred embodiment, Boot ROM 22 is implemented as two banks of bank switched 64 K byte ROM, 64 K of which can be used for Boot ROM program code. Boot ROM includes all of the firmware code necessary for basic hardware initialization and to implement a complete CCITT V.32 compliant modem. In addition, Boot ROM 22 contains the code needed to perform basic diagnostics on Emulation RAM 26 (e.g. checksum) in order to assure the integrity of the code stored in Emulation RAM 26. Boot ROM 22 also stores the routines needed to download firmware upgrades to the modem 10 to be stored in Emulation RAM 26.

Emulation RAM 26 is used to store a set of operating programs for microprocessor 14 and may act either to augment the programs stored in Boot ROM 22 or to replace it. In the preferred embodiment, Emulation RAM 26 stores a complete replacement of the code stored in Boot ROM 22 and in addition stores any desired enhancements to the basic V.32 operation along with diagnostics and the facilities to recognize that a download of new firmware is to be implemented. In the preferred embodiment, Emulation RAM 26 includes 192 K bytes of paged random access memory.

Figure 2:
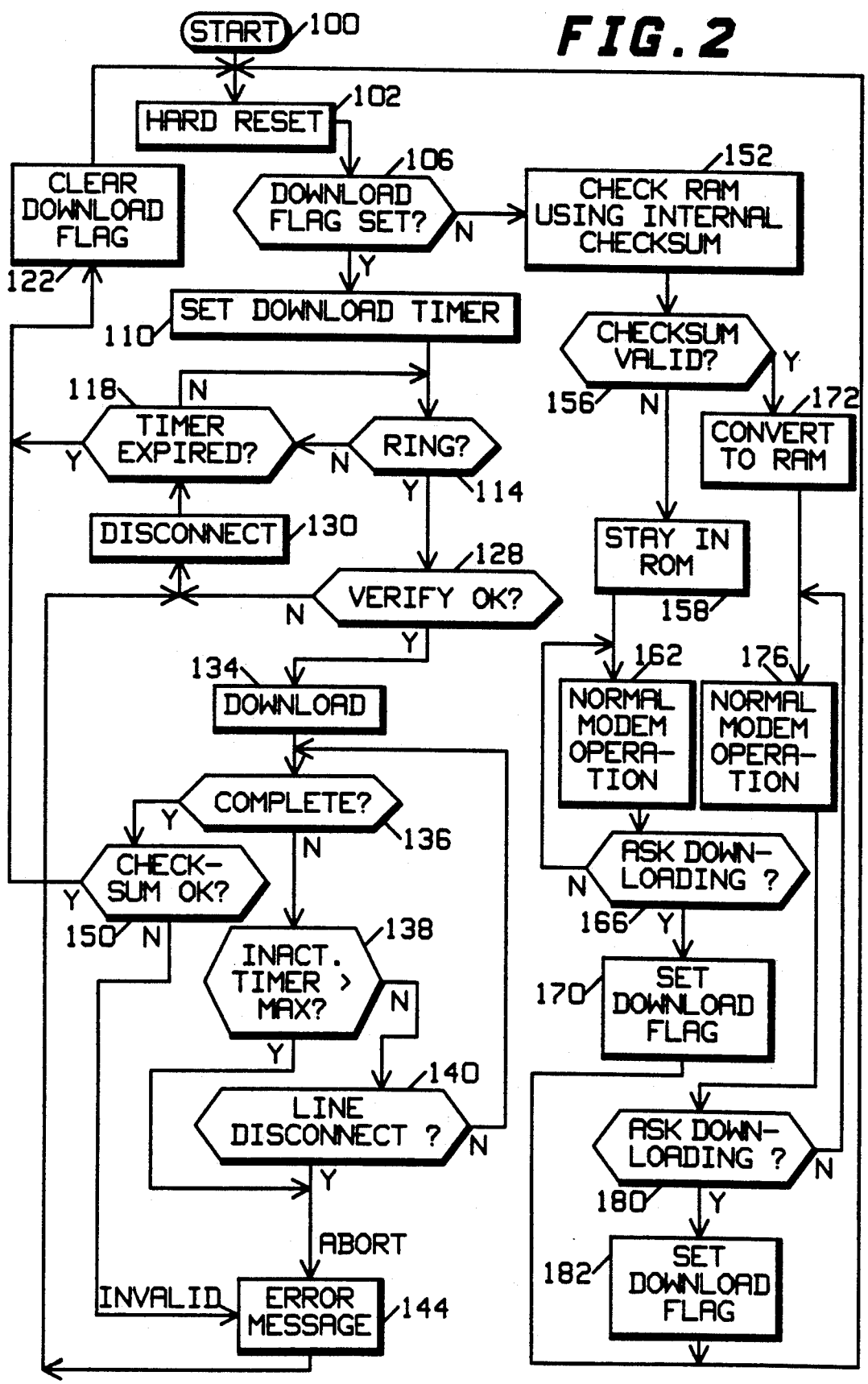
FIG. 2 is a flow chart of the operation of the present invention.

Turning now to FIG. 2, a flow chart of the overall operation of the modem 10 is shown. The program starts at 100 and a hard reset of the microprocessor 14 takes place at 102. The hard reset causes the microprocessor 14 to boot up from Boot ROM 22. A download flag, which is stored in an EPROM 23 (X2404p) in the preferred embodiment, indicates to the modem whether or not to expect a download of new firmware. If this flag is set at 106, a download timer is initiated at 110. The download timer is used as a protection mechanism to assure that the download operation begins within a predetermined period of time. In the preferred embodiment, the timer is 30 minutes.

The routine then waits for a ring at 114 while monitoring the timer at 118. If the timer expires at 118 before a ring at 114, the download flag is cleared at 122 and control returns to 102. If a ring is received at 114 prior to the timer expiring, a verification routine is entered at 128. In this routine, several items are checked to assure the integrity of the download. The ID of the caller is verified and the date of the download code is compared with that of the code already stored in Emulation RAM 26. If the ID is incorrect or the date is the same as stored in Emulation RAM 26, the verification fails and the line is disconnected at 130. Control then returns to step 118 so that the loop which waits for a ring continues.

If the verification passes at 128, the download process begins at 134. In the download process, a complete new set of code to be stored in Emulation RAM 26 is transmitted from a remote modem to the present modem 10. Write control logic 38 permits the new code to replace that which was previously stored in Emulation RAM 26.

The download process is monitored by an inactivity timer, which is started at the beginning of the download process, and a line-disconnect detection process. In the preferred embodiment, the inactivity timer is 120 seconds. In steps 136, 138 and 140, the status of the download is monitored and if the inactivity timer expires or the line is disconnected prior to completion of the download, the download is presumed to be invalid. At this point, an error message is generated at 144 and control passes to step 130.

If the download is completed at step 136, the checksum is tested at step 150. If the checksum of the new code is invalid at 150, an error message is generated at 144 and control returns to 130. If the checksum is valid at 150, the download flag is cleared at 122 and the modem resets at 102.

After a hard reset at 102, if the download flag is not set at 106, the validity of the Emulation RAM's internal checksum is verified at 152 to assure that the code in the Emulation RAM 126 is valid. If the checksum is not valid at 156, the modem 10 continues to operate as a basic V.32 modem according to the program stored in the Boot ROM 22 at 158 and proceeds to normal modem operation at 162. If a download is ordered at 166, normal modem operation is interrupted and the download flag is step at 170. A hard reset is then initiated at 102 to begin the previously described download process.

If the test of the Emulation RAM checksum at 152 indicates that the checksum is valid, the modem converts to operation under control of the Emulation RAM 26 at 172. The modem then operates as a normal modem at 176 under control of the Emulation RAM firmware until such point as power is lost or download is ordered at 180. If a download is ordered, the download flag is set at 182 and control returns to 102.

In the preferred embodiment, the modem 10 actually uses three microprocessors. The first two processors share the remaining duties of the modem and shares access to memory 20 via a bidirectional latch. The two processors work together and often share duties to implement the bulk of the modem operation. In general, the first microprocessor is an Intel 8031 processor which is primarily responsible for sending commands and receiving status from the second processor, general control tasks, task scheduling, control/display panel operations, control of the data pump, transmitting dialing functions to the data pump, requesting downloading from remote location, handling download flag, ring processing, disconnecting and converting to RAM mode upon receipt of a token from the second microprocessor.

The second microprocessor is an Intel 8032 whose functions are to initialize the modem's serial communications controller, pass data to and from the data pump and DCE port, load Emulation RAM with new code, perform data compression (e.g. MNP), processing of the AT command set, download timers, verification (step 128 of FIG. 2), checksum, error processing, process DTE data, dialing stream, speed matching, and RTS-DCD simulation.

The third microprocessor, a Texas Instruments TMS320C25 signal processing microprocessor, is used to implement the modem's data pump functions and does not directly access the memory 20.

In the preferred embodiment, the Emulation RAM is write protected by using a directional buffer on its data bus to prevent the first microprocessor from corrupting it. Thus, the first microprocessor considers the Emulation RAM to be Read Only. The second microprocessor depends upon the write line being pulled high on the Emulation RAM for write protection.

Those silled in the art will recognize many variations of the present invention which can be implemented without departing from the invention. For example, the code downloaded to the Emulation RAM can be used merely to supplement the code stored in Boot ROM. Many variations of the sequence of program steps can be made and other techniques can be used for verification of the download.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A data modem for transmitting and receiving data over a telephone line, comprising in combination:
    a programmable processor for performing a modem function under control of a stored program;
    boot memory means for storing a first set of computer-executable instructions for use by said processor, said first set of computable-executable instructions being adequate to permit said modem to transmit and receive data over a telephone line;
    means for receiving a second set of computable-executable instructions over said telephone line from a remote location;
    alterable memory means for storing said second set of computer-executable instructions for use by said processor, said second set of computer-executable instructions substituting for at least a portion of said first set of computable-executable instructions;
    battery backup means coupled to said alterable memory means for maintaining the information within said alterable memory means when power is removed from said modem; and
    write control means for preventing corruption of said second set of computer-executable instructions,
    whereby, information received by said modem over said telephone lines is used to alter the manner in which said modem communicates over said telephone lines.

2. A method for updating computer-executable firmware in a data modem, comprising the steps of:
    booting up said modem's internal processor from a ROM, said ROM having adequate information stored therein to permit said modem to perform at least basic modem data communications functions;
    inspecting a download flag to determine whether or not said computer-executable firmware is to be updated;
    if said computer-executable firmware is not to be updated, entering a mode of normal modem operation;
    if said computer-executable firmware is to be updated, placing said data modem in autoanswer mode;
    receiving a call from a source modem;
    receiving a set of updated computer-executable firmware instructions from said source modem;
    storing said set of updated computer-executable firmware instructions in an alterable memory;
    performing an error check on said updated computer-executable firmware instructions stored in said alterable memory;
    if said error check indicates that said updated computer-executable firmware instructions are valid, resetting said download flag; and
    booting said modem's internal processor.

3. A data modem for transmitting and receiving data over a telephone line, comprising in combination:
    a programmable processor for performing a modem function under control of a stored program;
    boot memory means for storing a first set of computer-executable instructions for use by said processor, said first set of computable-executable instructions being adequate to permit said modem to transmit and receive data over a telephone line;
    means for receiving a second set of computable-executable instructions over said telephone line from a remote location;
    alterable memory means for storing said second set of computer-executable instructions for use by said processor, said second set of computer-executable instructions substituting for at least a portion of said first set of computable-executable instructions;
    battery backup means coupled to said alterable memory means for maintaining the information within said alterable memory means when power is removed from said modem; and means for verifying that said second set of computer-executable instructions are originating from an authorized source, whereby, information received by said modem over said telephone lines is used to later the manner in which said modem communicates over said telephone lines.

4. A data modem for transmitting and receiving data over a telephone line, comprising in combination:
- a programmable processor for performing a modem function under control of a stored program;
- boot memory means for storing a first set of computer-executable instructions for use by said processor, said first set of computable-executable instructions being adequate to permit said modem to transmit and receive data over a telephone line;
- means for receiving a second set of computable-executable instructions over said telephone line from a remote location;
- alterable memory means for storing said second set of computer-executable instructions for use by said processor, said second set of computer-executable instructions substituting for at least a portion of said first set of computable-executable instructions;
- battery backup means coupled to said alterable memory means for maintaining the information within said alterable memory means when power is removed from said modem;
- timing means for timing the amount of time required to receive said second set of computer-executable instructions; and
- means for comparing said time with a predetermined maximum to determine if said second set of computer-executable instructions is valid, whereby, information received by said modem over said telephone lines is used to alter the manner in which said modem communicates over said telephone lines.

5. A data modem for transmitting and receiving data over a telephone line, comprising in combination:
- a programmable processor for performing a modem function under control of a stored program;
- boot memory means for storing a first set of computer-executable instructions for use by said processor, said first set of computable-executable instructions being adequate to permit said modem to transmit and receive data over a telephone line;
- means for receiving a second set of computable-executable instructions over said telephone line from a remote location;
- alterable memory means for storing said second set of computer-executable instructions for use by said processor, said second set of computer-executable instructions substituting for at least a portion of said first set of computable-executable instructions;
- battery backup means coupled to said alterable memory means for maintaining the information within said alterable memory means when power is removed from said modem;
- said boot memory means includes a set of computer-executable instructions which perform a checksum comparison on said second set of computer-executable instructions; and
- means for disregarding said second set of computer-executable instructions if said checksum comparison indicates that said second set of instructions is invalid, whereby, information received by said modem over said telephone lines is used to alter the manner in which said modem communicates over said telephone lines.

* * * * *